D. PECHER.
AEROPLANE.
APPLICATION FILED SEPT. 28, 1918.

1,296,551.

Patented Mar. 4, 1919.

INVENTOR
Daniel Pecher
BY
his ATTORNEY

UNITED STATES PATENT OFFICE.

DANIEL PECHER, OF PRINCETON, BRITISH COLUMBIA, CANADA, ASSIGNOR OF ONE-THIRD TO TOM GUYTON AND ONE-THIRD TO JOSEPH PAWLICK, BOTH OF PRINCETON, BRITISH COLUMBIA, CANADA.

AEROPLANE.

1,296,551.                    Specification of Letters Patent.         Patented Mar. 4, 1919.

Application filed September 28, 1918.   Serial No. 256,019.

*To all whom it may concern:*

Be it known that I, DANIEL PECHER, a subject of the Emperor of Austria, residing at Princeton, Province of British Columbia, Dominion of Canada, have invented certain new and useful Improvements in Aeroplanes, of which the following is a specification.

This invention relates to improvements in machines for navigating the air and has as its special object to provide a machine having a propeller arranged over the apparatus which may be used in the manner of a helicopter at any desired time whereby the raising of the apparatus may be accomplished in a ready manner.

A further object is to provide means whereby the blades of the helicopter propeller may be folded and disconnected from their source of power at any desired time.

These and other like objects are attained by the novel construction and combination of parts hereinafter described and shown in the accompanying drawings, forming a material part of this disclosure, and in which—

Figure 1:
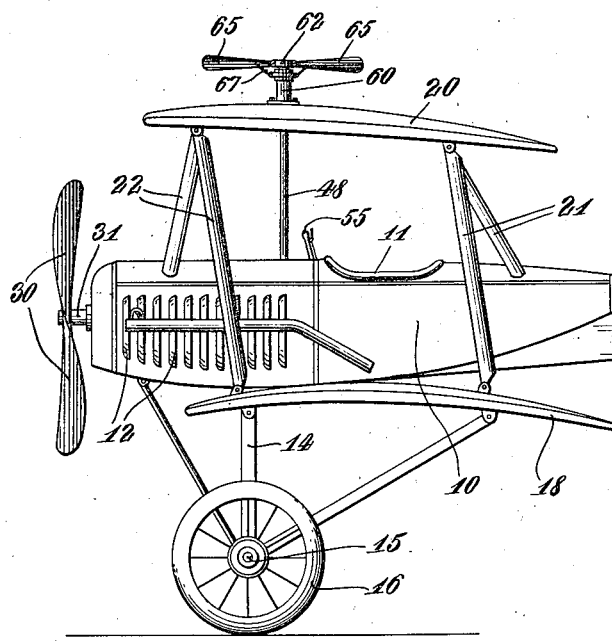
Figure 1 is a side elevational view showing a flying machine made in accordance with the invention.
Figure 3:
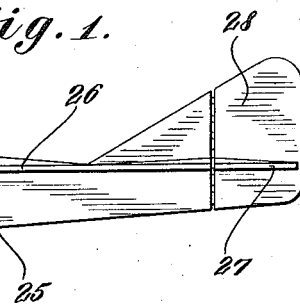
Fig. 3 is a further enlarged fragmentary view, of the helicopter propeller indicating the manner in which the blades may be folded.
Figure 2:
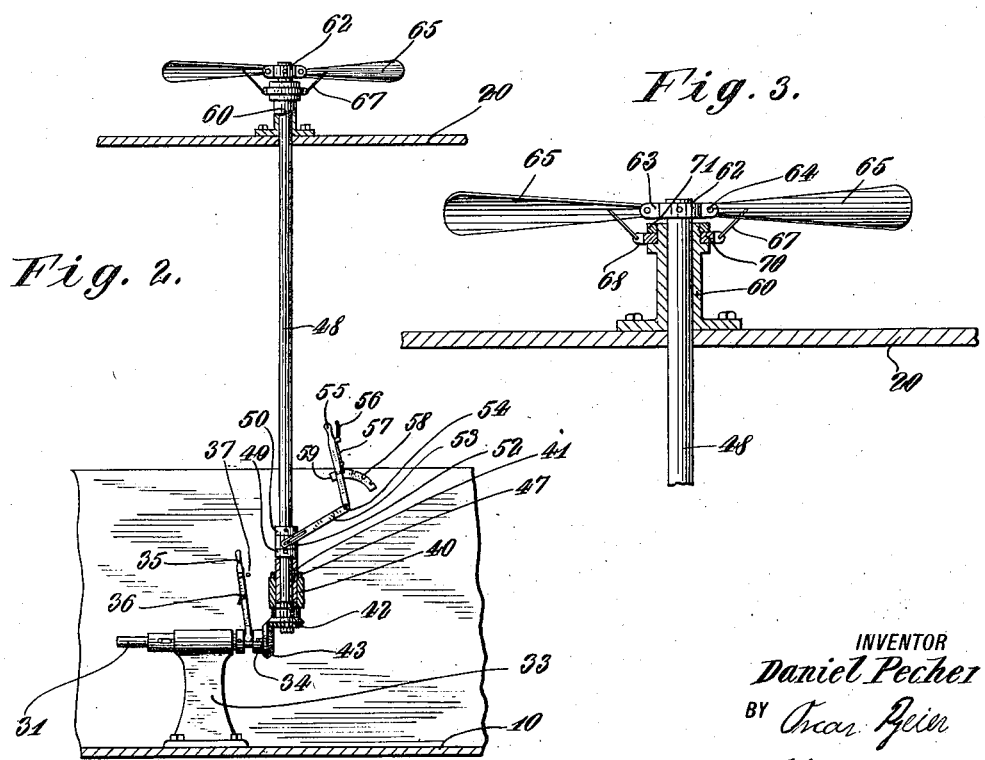
Fig. 2 is an enlarged fragmentary side elevational view of the helicopter propeller, showing the manner in which it is driven from the motive shaft.

Referring to the drawings, the body of the machine, which is substantially cigar shaped, is provided with an opening 11, for the entrance of the navigator, the engine being in advance thereof, as is indicated by the casing 12, the body being supported upon bars 14, extending upward from the axle 15, having engaged at its ends a pair of resilient wheels 16.

Immediately below the body 10, is the usual elongated plane 18, a similar plane 20, being disposed over the body, the same being engaged by rods 21 and 22.

Extending from the rear of the car to a considerable distance is a vertical blade 25, a horizontal blade 26 being engaged therewith, both of which extend to the vertical and horizontal rudders, respectively 27 and 28.

A propeller 30 of the ordinary type used upon flying machines is arranged at the front, the propeller being mounted on the shaft 31, operated direct by the engine contained within the casing 12.

The shaft 31 extends toward the rear and is mounted partially in the fixed bracket 33, through which it extends, a sliding collar 34, keyed to the shaft so as to revolve with it and operated by a lever 35, mounted on pins 36 and provided with stop pins 37, controlling its range of movement.

Also secured in the casing 10, is another bracket 40, in which is rotatably mounted a sleeve 41, engaged at its lower end with a bevel gear 42, meshing with the bevel gear 43, on the end of the shaft 31 and operated by the lever 35, so that the teeth of the gears may be moved into or out of mesh.

Rotatable in the sleeve 41, is a quill 47, fitted to the lower end of a shaft 48, upon which are fixed collars 49 and 50, a rotatable collar 52 being arranged between the fixed collars, the same being engaged by the slotted forks 53, of a bell-crank lever pivoted at 54, the upper end 55 of the lever having engaged with it a detent handle 56, the lower or engaging end 57 of which engages in recesses 58, formed in the segment 59; thus, as the lever handle 55 is moved, the shaft is caused to slide through the gear vertically.

The shaft extends upwardly through the upper plane 20, on which is mounted a bracket 60, acting as a journal for the upper end of the shaft, which is rigidly engaged with a fixed collar 62, having oppositely disposed lugs 63 arranged in pairs, the lugs having fixed in them pins 64, upon which are pivoted the blades 65, in such manner that as the vertical shaft 48 is rotated, rotary motion is conveyed to the propeller.

Attached near the inner ends of the propeller blades 65 are pivoted links 67, engaged at their opposite lower converging ends in lugs 68 extending out from a collar 70 loosely journaled in the upper end of the bracket and held in engagement therewith by a clamp nut 71; thus, as the spindle 48 is raised by operating the lever 65 the shaft is projected upwardly carrying the collar 62, and inner ends of the propeller blades which, due to their connection with the links 67 are turned downwardly in the manner of an umbrella and effecting no operative results in the air.

When it is desired to use the upper propeller in the manner of a helicopter, the shaft is brought downwardly by the lever 55 and engagement is made between the pinion 43 and 42 so that rotary motion is conveyed to the propeller blades.

From the foregoing it will be seen that an effective device has been disclosed for disconnecting the helicopter and that the blades thereof may be folded when unused.

It will also be observed that the operative devices, whereby the propeller may be put to motion or remain folded, are within ready reach of the operator within the body 10, and that when the helicopter is operated the apparatus will be caused to rise substantially vertical and without any preliminary run upon a level surface.

Having thus described my invention what I claim as new and desire to secure by Letters Patent, is—

In a flying machine, the combination with a hollow casing, a motor carried therein, a horizontal shaft operated by said motor and a propeller at the front of said casing driven by said shaft, of a vertical shaft mounted in said casing extending thereabove, a sleeve on the end of said vertical shaft, a gear carried on said sleeve, a second gear carried on the end of said horizontal shaft, means for connecting and disengaging said gears, means for raising or lowering said vertical shaft, a collar fixed upon the upper extending end of said vertical shaft, lugs extending outward from said collar, a pair of opposed blades pivoted in said lugs, links engaging with said blades extending convergingly downward, and a collar with which the ends of said links are engaged whereby when said vertical shaft is raised said blades are caused to assume an angular position.

In testimony whereof I have affixed my signature.

DANIEL PECHER.